(No Model.)  5 Sheets—Sheet 1.
W. F. THIEMEYER.
MACHINE FOR THE MANUFACTURE OF BOXES FOR THE TRANSPORTATION OF BOTTLES.
No. 448,465. Patented Mar. 17, 1891.
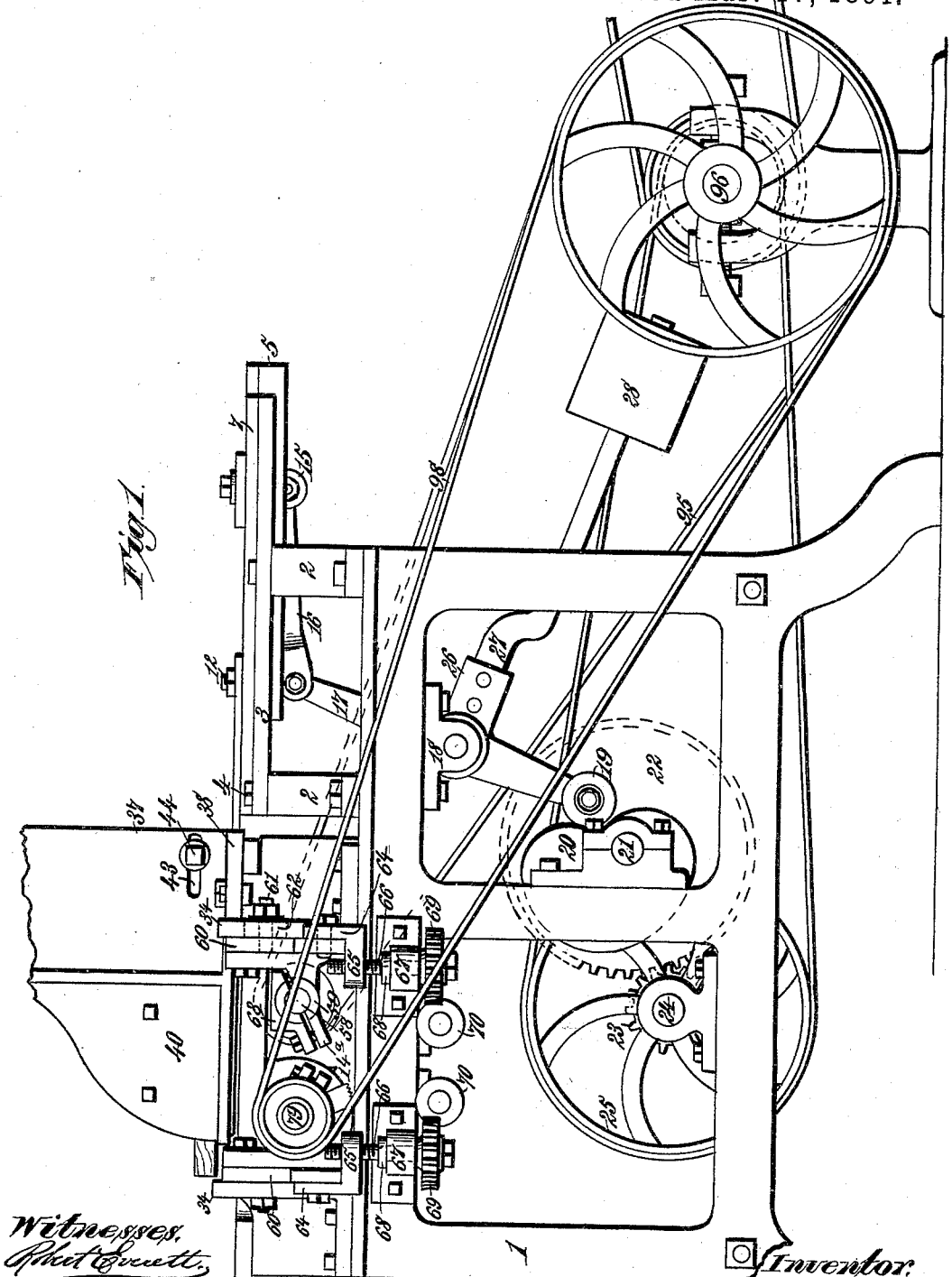
Witnesses:
Robt. Everett,
Dennis Sumby.
Inventor:
William F. Thiemeyer,
By James L. Norris
Atty.

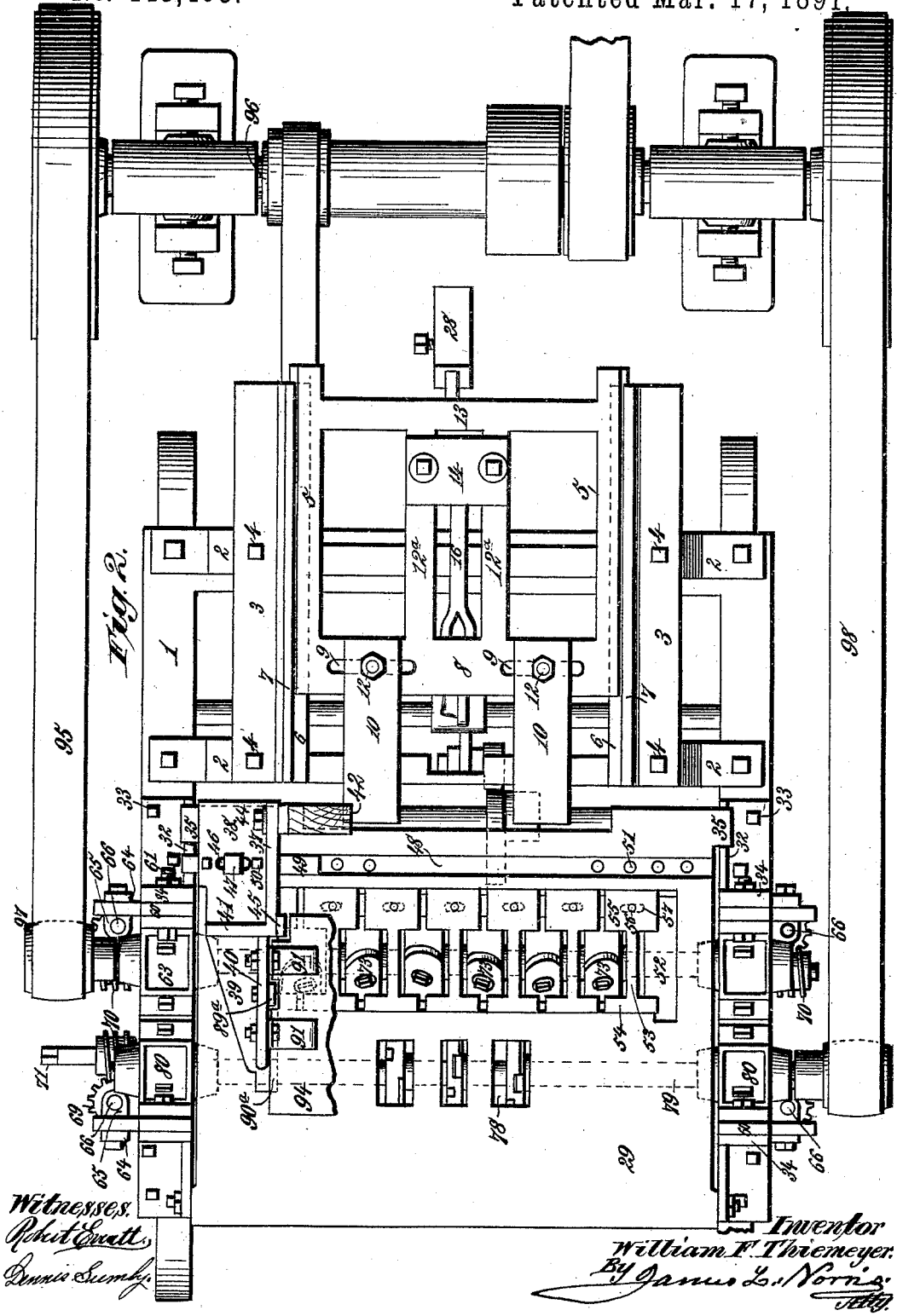

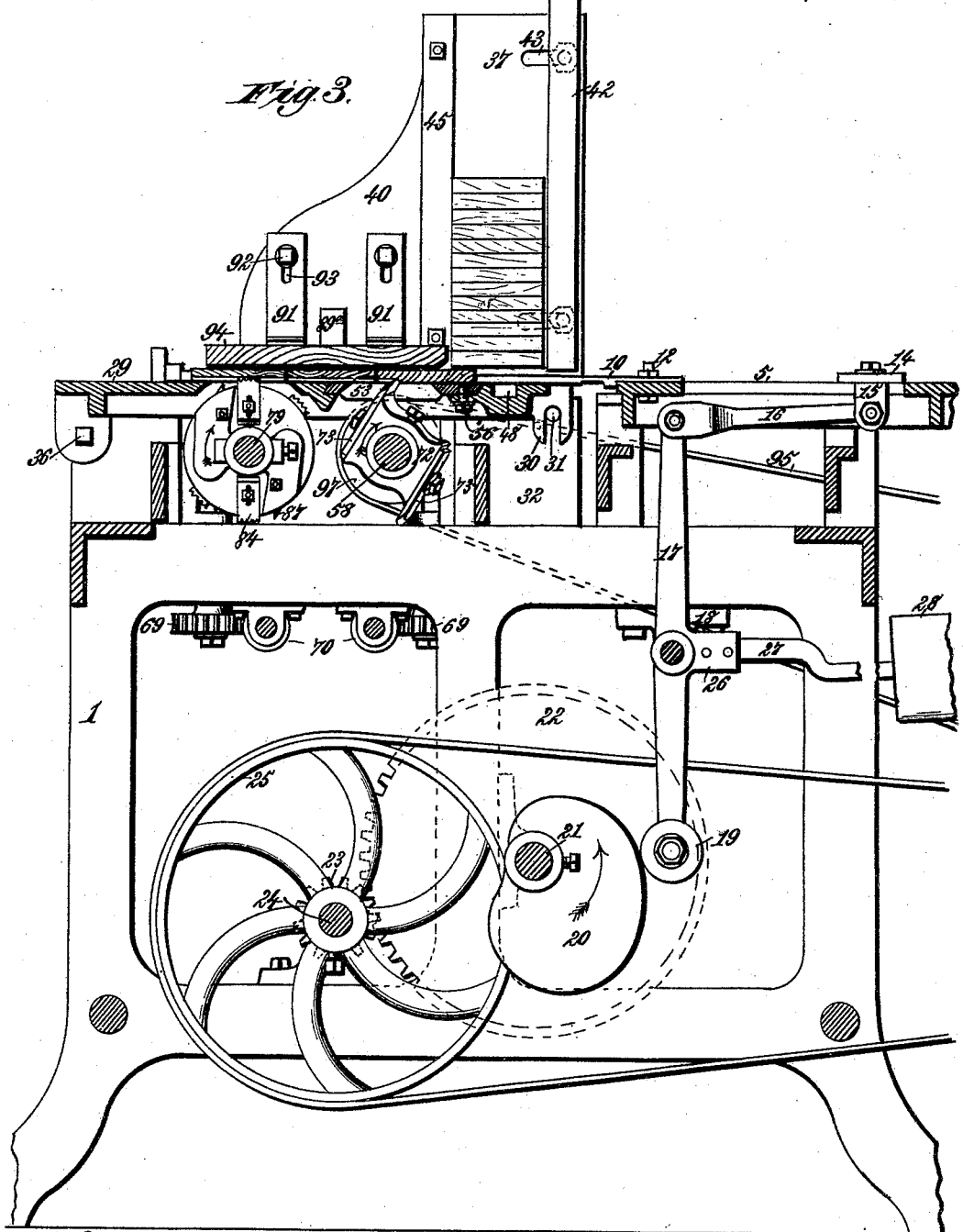

(No Model.) 5 Sheets—Sheet 4.
W. F. THIEMEYER.
MACHINE FOR THE MANUFACTURE OF BOXES FOR THE TRANSPORTATION OF BOTTLES.
No. 448,465. Patented Mar. 17, 1891.
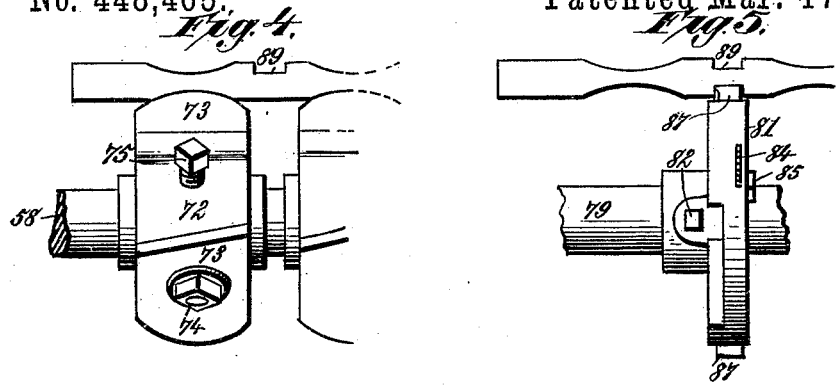
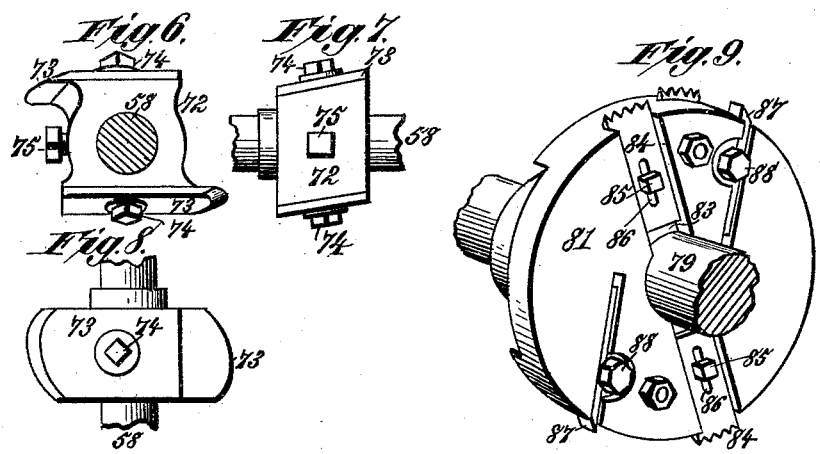
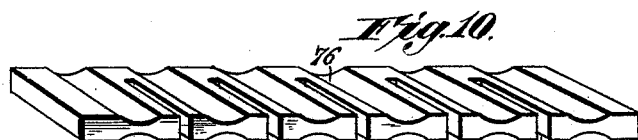
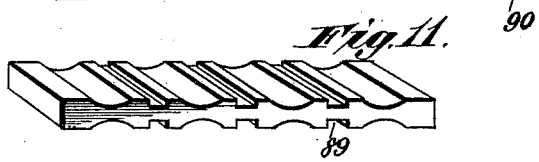
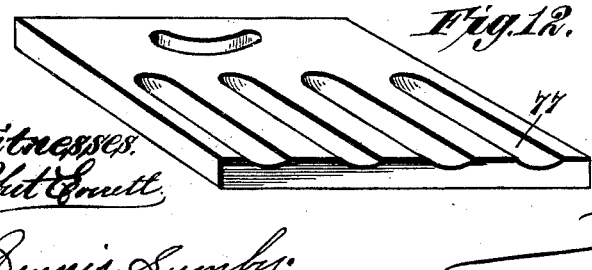
Witnesses:
Robt. Pruitt
Dennis Sumby
Inventor
William F. Thiemeyer
By James L. Norris
Atty.
THE NORRIS PETERS CO., PHOTO-LITHO., WASHINGTON, D. C.

(No Model.)  5 Sheets—Sheet 5.
W. F. THIEMEYER.
MACHINE FOR THE MANUFACTURE OF BOXES FOR THE TRANSPORTATION OF BOTTLES.
No. 448,465. Patented Mar. 17, 1891.
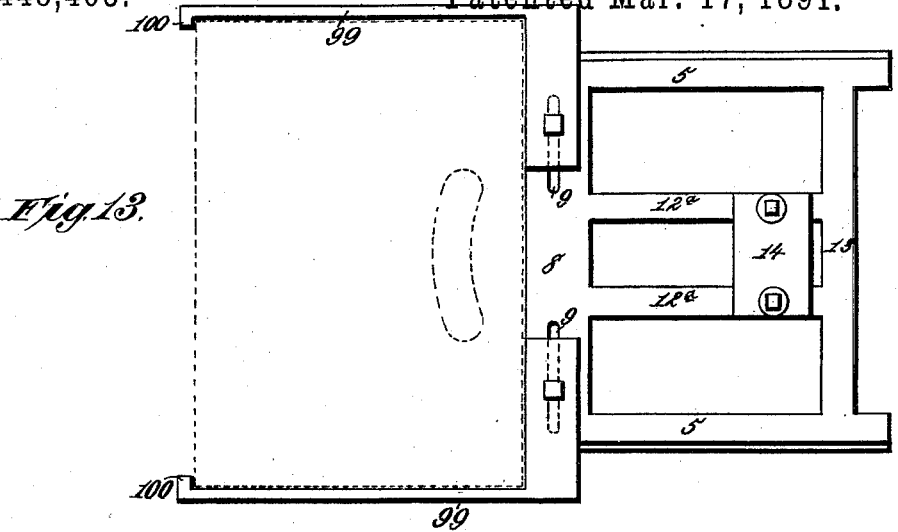
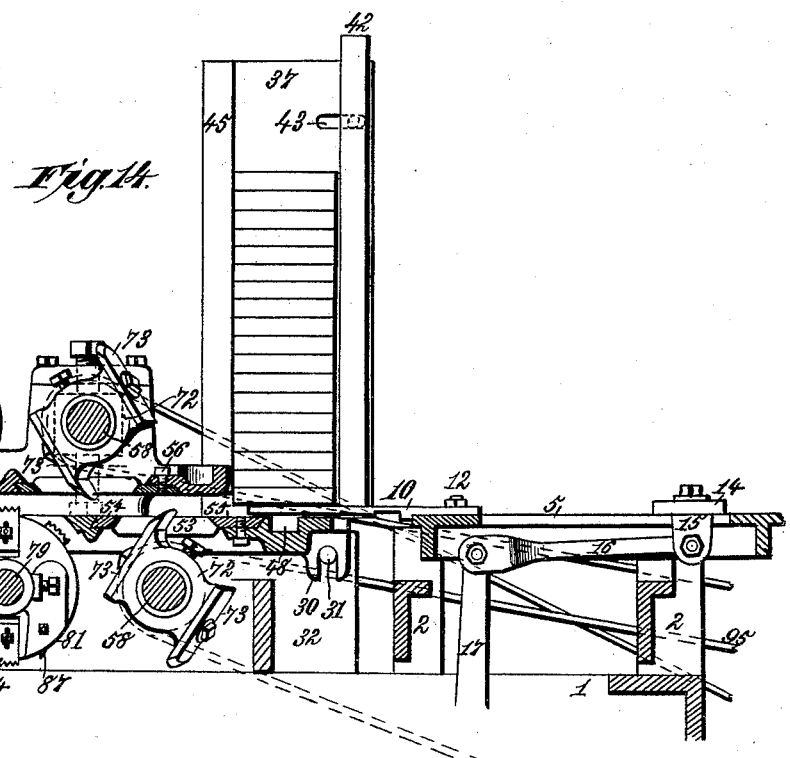
Witnesses.
Inventor
William F. Thiemeyer.
By James L. Norris
Atty.
THE NORRIS PETERS CO., PHOTO-LITHO., WASHINGTON, D. C.

UNITED STATES PATENT OFFICE.

WILLIAM F. THIEMEYER, OF BALTIMORE, MARYLAND.

MACHINE FOR THE MANUFACTURE OF BOXES FOR THE TRANSPORTATION OF BOTTLES.

SPECIFICATION forming part of Letters Patent No. 448,465, dated March 17, 1891.

Application filed May 24, 1890. Serial No. 353,085. (No model.)

*To all whom it may concern:*

Be it known that I, WILLIAM F. THIEMEYER, a citizen of the United States, residing at Baltimore, State of Maryland, have invented new and useful Improvements in Machines for the Manufacture of Boxes for the Transportation of Bottles, of which the following is a specification.

My invention relates to mechanism for the manufacture of that class of boxes used for the transportation and storage of bottles containing beer, mineral waters, and similar fluids.

It is the purpose of my invention to provide machinery for grooving or forming concave seats in the opposite walls of the crosspartitions separating the bottles one from the other and for forming similar but more extended seats in the faces of the walls of the box.

My invention has for its object to provide means whereby the partition-pieces may be fed automatically to the cutters and whereby the same means may be adapted to the feed of both the long and the short partitionstrips.

It is also the object of my invention to provide a machine having cutters for forming the concave seats in the longer partition-pieces, wherein the cutters are so arranged as to have each a shearing cut at opposite angles alternately, whereby a smooth clean cut is formed in the wood, said cutters being rendered adjustable as to the depth of the cut and likewise adjustable as to the intervals between said cuts, and to combine with the gang of cutters a second gang of channeling devices, which may be withdrawn from action when the mechanism is operating upon the long partition-strips and again brought into action when the short cross-strips are passing through the machine, the side cutters and channeling-chisels of the gang acting upon the short strips being adjustable to vary the depth of the grooves.

It is also the object of my invention to render certain parts of the machine removable and interchangeable, whereby the concave seats in the inner faces of the walls of the box may be formed smoothly and accurately.

It is also the object of my invention to provide means whereby the hopper from which the strips are fed may be contracted in two directions to adapt it to the two classes of strips which are fed therefrom.

It is finally the object of my invention to provide a duplex mechanism whereby the formation of the concave seats and the grooving between the seats in the short cross-partitions may be formed upon both sides of the said strips at one and the same feed movement.

My invention consists to these ends in the several novel features of construction and new combinations of mechanical parts hereinafter fully set forth, and then pointed out definitely in the claims which follow this specification.

To enable others skilled in the art to practice my said invention, I will proceed to describe the same in detail, reference being had to the accompanying drawings, in which—

Figure 1 is a side elevation of the machine, the upper portion of the hopper being broken away. Fig. 2 is a plan view of the mechanism shown in Fig. 1. Fig. 3 is a longitudinal vertical section taken in or about the center of Fig. 2. Fig. 4 is a detail view of a part of the gang of cutters, showing one cutter-head complete and part of another. Fig. 5 is a detail edge elevation of one of the channelingheads. Fig. 6 is a detail perspective of one of the cutter-heads. Fig. 7 is a detail elevation of the parts shown in Fig. 6, the line of view being transverse to the shaft. Fig. 8 is a plan view of the parts shown in Figs. 6 and 7. Fig. 9 is a detail perspective of one of the channeling-heads. Fig. 10 is a perspective view of one of the longer partition-strips after being finished. Fig. 11 is a similar view of one of the short transverse strips after being finished by the machine. Fig. 12 is a similar view of one of the end pieces or end walls of the box after the concave seats are formed. Fig. 13 is a plan view of the interchangeable feeding device combined with extensible withdrawing-arms to feed and withdraw the end walls. Fig. 14 is a sectional view showing the duplication of the cutting and channeling devices upon both the lower and upper sides of the feed-platform, whereby both sides of the strips may be finished by a single action of the machine.

In the said drawings, the reference-numeral 1 denotes the frame of the machine, upon which the operative parts are supported. Upon the end of this frame are mounted knee-brackets 2, upon each side of the frame, upon which are supported parallel plates 3, Figs. 1 and 2, bolted to the knee-brackets by bolts 4. These plates receive a frame 5, substantially rectangular in form, its parallel longitudinal edges being rested upon horizontal edges 6 and dovetailed into the upright edges 7 of said supports, as seen in Fig. 2. The front cross-plate 8 of this frame is provided with two transverse slots 9, and mounted upon said cross-plate are two similar feed-plates 10, fastened thereto by bolts 12, which are adjustable in the slots 9 to extend or diminish the distance or interval between the feed-plates. Extending from the cross-plate 8 are two parellel pieces $12^a$, which unite with the rear cross-plate 13, and upon these pieces, near the rear cross-piece, is a plate 14, bolted to the pieces $12^a$ and provided with a hanger 15, Fig. 3, to which is connected the pitman 16, by which the frame is reciprocated. This pitman is connected at its forward end to the upper end of a lever 17, pivoted between its ends in bearings 18. At its lower end the lever 17 is formed with a friction-roller 19, which rests against the periphery of a cam 20, mounted upon a shaft 21, journaled in bearings on vertical portions of the frame 1, said shaft being driven by a large gear 22, with which a small gear 23 meshes, the latter being carried by a shaft 24, having a belt-pulley 25. Upon the lever 17 is rigidly mounted a socket 26, in which is inserted an arm 27, having at its end a weight 28, which causes the friction-roll 19 to hug the cam 20 closely after the cam has made its throw, and thereby return the frame 5 to its position after each feed movement.

Near the knee-brackets 2 at each side of the frame is mounted a bracket 32, secured by bolts 33 to the frame. The brackets 32 engage lugs 35, formed upon the rear end of the table, to give a support additional to that afforded by the forked lugs 30 and studs 31. The table 29 extends to the extreme rear end of the machine, where it is pivotally supported by bolts 36. Upon each side of this table is mounted a bracket 37, having a floor-piece 38, which rests upon the table and is connected thereto by means which will be described hereinafter. This floor-piece is extended forward to form a foot 39, having a vertical plate 40 rising from the same and having its edge abutting against the transverse wall of the bracket. The longitudinal wall of the bracket rises to a suitable height, as shown in Fig. 3. Upon the rearward end of the wall of the bracket is bolted a guide-strip 42, which extends a short distance transversely of the table and is rendered longitudinally adjustable by means of horizontal slots 43 in the wall in which the fastening-bolts 44 are movable. Upon the other end of the said wall 34 is a strip or cleat 45, parallel with the guide-strip 42 and fastened by any suitable means, such as bolts. The similar bracket on the opposite side of the table is not shown, being removed to show the underlying parts, but it is the duplicate in every respect of the one just described. These parts form the hopper in which the strips or partitions are piled and dropped by gravity upon the table in front of the feed-plates 10. The adjustment of the guide-strips is provided to adapt the hopper to either the wider and longer partition-pieces shown in Fig. 10 or the shorter or narrower strips shown in Fig. 11. These strips being also of unequal length, it will be seen that a transverse adjustment of the opposite parts of the hopper will also be required, and this is effected in the manner following:

In the floor-pieces 38 of the brackets supporting the parts of the hopper are formed slots 46, which receive bolts 47, passing down through the table, by loosening which the opposite parts of the hopper may be pushed toward or from each other to adapt the hopper to feed either the long strips shown in Fig. 10 or the short strips shown in Fig. 11. This adjustment for length, however, is not completed simply by the use of the slots 46 and bolts 47, since these are not of sufficient extent to give the required movement. I therefore form in the table 29 a channel 48, running transversely of the table and directly beneath the brackets and the hopper. Upon the bottom 36 of each bracket-supporting part of the hopper is mounted a strip 49, filling but moving freely in the channel 48. In the bottom 38 of each of the supporting-brackets are placed bolts 50, which pass down through said strip 49, binding the latter to the bracket.

When it is desired to make an adjustment, the bolt 50 is released and raised and the entire bracket with its parts is moved in either direction. When the proper point is reached, or approximately so, the said bolt is dropped into one of the openings 51 in the channel and fastened and the other and opposite bracket is moved in the same way. If it be found that some slight adjustment is still required, one or both of the bolts 47 is loosened and the bracket is moved as required, this final adjustment being the purpose of the slots 46.

Beneath the forward portion of the hopper and extending some distance in front of the same is a broad transverse opening 52 cut in the table, its ends lying beneath the brackets sustaining the hopper. In this opening are arranged at suitable intervals filling and sustaining pieces consisting each of a longitudinal web 53, having a cross-head 54 at its forward end and a broader cross-head 55 at the other end. The cross-heads 54 are dovetailed into the forward edge of the opening 52, as seen in Fig. 3, whereby they are prevented from rising, and the cross-heads 55 are fastened by screws 56, which pass up through transverse slots 57 in the table, (shown by dotted lines in Fig. 2,) the ends of said screws being centrally tapped into the cross-heads 55. The purpose of these slots is to permit a limited adjustment of the sustaining-pieces transversely of the table. By the construction and arrangement of these pieces a series of openings is formed separated from each other by the webs 53. Lying beneath these openings is a cutter-shaft 58, journaled at its ends in bearings 59, Fig. 1. These bearings consist each of an L-shaped bracket 60, which is bolted to the vertical wall 34 of the brackets which support the lugs on the rear end of the table. The bolt 61, which unites these parts, lies in a slot 62 in the wall 34 to permit vertical adjustment. Upon the L-shaped bracket 60 is mounted the lower bearing 59, consisting of a vertical arm, which is bolted to the bracket 60 and provided with a downwardly-inclined arm 14$^a$, having a half-bearing for the shaft-journal. A top plate 63 is fastened on the bearing by screws or bolts.

Upon the outwardly-projecting arm of the L-bracket 60 is bolted a plate 64, having a forwardly-projecting block 65, through which is tapped a screw-bolt 66, journaled in a side bracket 67, in which it is sustained by a collar 68. Upon the lower end of this vertical screw-shaft is a worm-gear 69, with which a worm 70 meshes, carried by a shaft which extends to the opposite side of the machine, where the parts already described are duplicated, the worm-shaft being provided with a squared head 71 to receive a key, whereby the shaft may be rotated and both ends of the cutter-shaft raised and lowered at the same time and uniformly.

Upon the cutter-shaft 58 is mounted a series of cutter-heads 72, having opposite flat and parallel faces, which are inclined at an acute angle to the axis of the cutter-shaft, as seen in Fig. 7. Upon these flat inclined faces are laid the cutters 73, which are secured to the head by bolts 74. The purpose of inclining the cutters in the manner shown in Figs. 6 and 7 will be explained hereinafter. Each cutter-head is clamped upon the shaft by a bolt 75, whereby it may be adjusted to bring the lines of cut more closely together or to separate them. Each head is arranged to cut centrally in the several openings between the webs 53, as shown in Fig. 2, and I prefer to so arrange them upon the shaft 58 that the cutters shall not all enter the wood at the same instant, as this arrangement avoids strain upon the machine and renders its action more smooth and uniform. The cutting-edges of the blades 73 are rounded or convex, and it is by their action that the concave seats 76, Fig. 10, are formed in the partition-strips, as well as the seats 77 in the walls of the box, as seen in Fig. 12.

A short distance in front of the series of openings in which the cutters 72 operate are formed openings 78, beneath which is journaled a shaft 79, supported in bearings 80, which are substantially the duplicates of those sustaining the cutter-shaft 58. This shaft 79 also, like the cutter-shaft, is vertically adjustable by mechanism which is merely the duplicate in all material respects of the parts raising and lowering the shaft 58, and therefore requires no specific description. Upon this shaft are mounted channeling-heads 81, Figs. 5 and 9, fastened in place by a screw 82 to permit a lateral adjustment similar to that provided for the cutter-heads. These heads 81 each consist of a circular block having in each flat face a diametrical channel 83, in which are placed blades 84, fastened by bolts 85, which pass through slots 86 in the blades, whereby a radial adjustment to vary the depth of the cut is permitted. The channel 83 upon one face does not lie in the same line with that upon the opposite face, and therefore the blades whose serrated ends project beyond the periphery of the circular head cut one a little in advance of the other. Behind each pair of cutting-saws is a chisel 87, inserted in a slot in the head and held in place after adjustment by a bolt 88. This channeling-head forms the channels or grooves 89 in the transverse partition-pieces shown in Fig. 11. With these channels engage slots 90 in the long partitions, these slots being at present formed by a gang of saws after the concave seats are formed.

Upon the inner faces of the plates 40 are mounted elastic angle-plates or strong springs 91, held by bolts 92, which lie in slots 93 in the angle-plates to give vertical adjustment. Beneath the horizontal members of these angle-plates or springs is a strip-holding plate or board 94, beneath which the partition-strips pass as they are fed to the grooving and channeling mechanism and by which they are held down to the cutters.

A lug 89$^a$, fastened to the plate 40, lies in a notch in the end of the board and prevents its displacement. Upon the inner faces of the plates 40 are also formed narrow ledges 90$^a$ (shown in dotted lines in Fig. 2) and arranged at a distance above the table, a little less than the thickness of the strips being worked. As the strips all pass out the board will drop down slightly and rest upon the ledges until the next strip is taken out of the hopper by the feed-arms 10. This strip will engage the beveled edge of the board, Fig. 3, and raise it against the elastic angle-plates or springs 87. The cutter-shaft is driven by a belt 95, geared from a pulley on a counter-shaft 96 to a small pulley 97 on the end of the shaft, Fig. 2, and the channeling-shaft is driven by a similar belt 98 on the other end of the counter-shaft.

It will be noted from Fig. 3 that the feed-plates 10 do not carry the partition-strips quite far enough to complete the groove by the cutters 72. These plates as they advance push the lower board out of the hopper, and as it passes entirely out therefrom the entire pile remaining therein descends upon the arms 10, which are not as thick as the strips, and as the feed-plates recede the board which has been expelled is held by the next in succession, which drops entirely down behind the first strip by the weight of the pile in the hopper.

With the form of machine shown in Figs. 1, 2, and 3 the strips are taken as they issue from the machine and are put into the hopper again, their plain or unworked faces being downward, and are grooved upon the other side. I may, however, use a duplex mechanism like that shown in Fig. 14, in which the grooving and channeling devices are duplicated above the table.

In forming the concave seats 77 in the walls of the box a modified form of feeding device is required, as these seats do not extend entirely across the face of the wall, Fig. 12. For this purpose I simply remove from the feed-frame 5 the plates 10 and substitute therefor the L-shaped frames 99, Fig. 13, which are adjustable laterally in the same manner as the feed-plates 10. At their ends these frames have inwardly-turned lugs 100, and within these lugs and the frames the end wall of the box lies and fits with the required accuracy. The cam 20 is then removed and a different cam substituted to give the required length of groove. The hopper is removed also, as the boards are fed in singly and by hand, and the channeling-shaft is lowered to take the saw-blades out of the way. In all other respects the construction and operation are the same as that already described.

The inclined arrangement of the cutters 73 (shown in Fig. 7) is for the purpose of giving a shearing cut first at one angle and with one cutter and then with the succeeding cutter at the opposite angle. This gives a smooth clean groove without any burring of the wood. It will also be seen that as the cutters operate upon each strip throughout a part only of its width at each stroke of the feed-plates there must be some means for holding the board being acted upon until the next forward feed movement takes place. This is done, as I have already set forth, by the pile dropping down in the hopper upon the feed-arms 10 as one of the strips passes completely out of the hopper, thereby giving a shoulder against which the partly-grooved board abuts as the feed-arms 10 retract. Thus each strip is fed to the cutters by an ensuing strip, the edges of the two being pressed so closely together as to form practically a single piece of wood. Thus as the cutters reach the lines between the contacting edges of the strips said cutters form a perfectly-clean edge cut, instead of splintering them and forming a rough unsightly edge which must be dressed off before it can be used as part of the box.

What I claim is—

1. In a machine for forming concave seats in the partition strips and walls of boxes for the transportation of bottles, the combination, with a reciprocating feed-frame having one or more feed-plates, of a hopper mounted on a table having openings, a series of cutters having rounded or concave edges revolving in said openings and arranged at equal distances apart, a series of channeling-tools revolving in spaces in front of said cutters, means for lowering the shaft of said channeling devices, a strip-holding plate or board located in front of the hopper and beneath which the strips pass to the cutters and channelers, and vertically-adjustable elastic angle-plates or springs which press said board upon the strips during the time they are operated upon, substantially as described.

2. In a machine for forming concave seats in the partition strips and walls of boxes, the combination of a reciprocating feed-frame having laterally-adjustable feed-plates of less thickness than the strips to be worked, a hopper in which the strips are piled, a series of cutters having rounded edges revolving in openings in the table supporting the hopper, a strip-holding plate or board located in front of the hopper and beneath which the strips pass as the cutters act upon them, and elastic angle-plates or springs pressing said board down, whereby the strip last fed is held against the action of the cutters by the next succeeding strip as the feed-arms retract, substantially as described.

3. In a machine for forming concave seats in the partition strips and walls of boxes, the combination of a feed mechanism, a hopper containing the strips to be worked piled therein, the opposite parts of the hopper being laterally adjustable and one portion of each being longitudinally adjustable to various widths of strips, substantially as described.

4. In a machine for forming concave seats in the partition strips and walls of boxes, the combination of a hopper for holding the stack of partition-strips, a rectilinearly-reciprocating feeder which moves the lowermost strip from the hopper and temporarily supports the remainder of the pile therein, a series of vertically-adjustable revolving cutters mounted on a single shaft and located in front of the hopper for cutting a series of transverse parallel grooves in the strip, and a series of vertically-adjustable revolving channeling-saws and chisels located on a single shaft in front of the cutter-shaft for cutting a series of channels or slots in the previously-grooved strips as they leave the grooving-cutters, substantially as described.

5. In a machine for forming concave seats in the partition strips and walls of boxes, the combination of a hopper in which the strips are piled, a series of laterally-adjustable sustaining-pieces consisting of webs connecting cross-heads, those at one end of the webs being dovetailed, said cross-heads being set in an opening in the table of the machine and the others being secured by screws passing through transverse slots in the table, and a series of cutters revolving in the openings between the several webs, said cutters having heads which are laterally adjustable on the shaft, substantially as described.

6. In a machine for forming concave seats in the partition strips and walls of boxes, the combination of a table over which the strips are fed and a two-part hopper containing the strips, each supporting-bracket of the hopper having a bar or cleat bolted to its bottom, and being provided also with a transverse slot, through which passes a bolt into openings arranged in series in a transverse channel in the table which receives the bars or cleats and guides the parts of the hopper in their transverse adjustment, substantially as described.

7. In a machine for forming concave seats in the partition strips and walls of boxes, the combination of a table over which the strips are fed, a spring-pressed board beneath which they pass, a series of laterally-adjustable cutters rotating in openings in the table and acting upon each strip, a succeeding series of channeling devices, also laterally adjustable, and a two-part adjustable hopper capable of being contracted to receive the short strips acted on by both the cutters and the channeling devices, substantially as described.

8. In a machine for forming concave seats in the partition strips and walls of boxes, the combination of a hopper, a feeding device, a series of cutters, and a subsequently acting series of channeling devices, the latter consisting of circular heads adjustably mounted on a shaft and provided with diametrical channels arranged on the opposite faces at an angle with each other, in which are arranged on each side of the shaft radially-adjustable plates having serrated end edges, and chisels set behind each pair of channeling-saws and adjustable inward and outward in slots in the head, substantially as described.

In testimony whereof I have affixed my signature in presence of two witnesses.

WM. F. THIEMEYER.

Witnesses:
JAMES A. RUTHERFORD,
GEORGE W. REA.